April 14, 1970     E. BATLINER ET AL     3,505,919

ANCHORING DEVICE HAVING A KNURLED ANCHORING SURFACE

Filed April 5, 1968

INVENTORS
ELMAR BATLINER
ELMAR THURNER

By McGlew and Toren
ATTORNEYS

United States Patent Office 3,505,919
Patented Apr. 14, 1970

3,505,919
ANCHORING DEVICE HAVING A KNURLED
ANCHORING SURFACE
Elmar Batliner, Eschen, Liechtenstein, and Elmar
Thurner, Feldkirch-Gisingen, Austria, assignors to
Hilti Aktiengesellschaft, Schaan, Liechtenstein
Filed Apr. 5, 1968, Ser. No. 719,118
Claims priority, application Germany, Apr. 14, 1967,
H 62,446
Int. Cl. F16b 19/14
U.S. Cl. 85—10                                    9 Claims

ABSTRACT OF THE DISCLOSURE

An anchoring device arranged to be driven by means of a powder charge in a tool into a receiving material such as steel, sheet metal, and similar metallic materials is comprised of an axially extending shank portion having a leaded end and a trailing end. The shank portion is arranged to be driven with its leading end first into the receiving material. The shank portion has a frustoconically shaped section which extends from a point near the leading end toward the trailing end and its surfaces diverge toward the trailing end. The frustoconically shaped section is knurled and, preferably, the height of the knurled surfaces varies along the extent of the knurled portion of the shank.

SUMMARY OF THE INVENTION

The present invention is directed to anchoring devices such as bolts, studs, nails, and the like which are inserted into a receiving material such as steel, structural iron, sheet metal, and similar materials by means of a powder charge within a driving tool, and, more particularly, it is directed to an anchoring device wherein the surface inserted into the receiving material is roughened or knurled.

In the past it has been known to roughen, such as by knurling, the surface of an anchoring device which is driven into a receiving material. It is the purpose of such roughened surfaces to provide alternating ridges and depressions within which the receiving material flows to provide an improved bond between the anchoring device and the receiving surface. In the known devices the knurled surfaces have been provided on a cylindrical portion of the anchoring device which penetrates into the receiving material, and extraction values up to about 500 kp. have been developed. To increase the extraction values for such anchoring devices having knurled cylindrical surfaces, the length of the cylindrical part has to be increased since the specific adhesion force and the carrying capacity of the cylindrical shank increases with the increasing depth of the penetration into the receiving surface. However, if the lentgh is increased beyond a certain ratio of shank diameter to shank length the anchoring device no longer fully penetrates into the receiving material completely and it has a tendency to buckle or to shear off at the surface of the receiving material.

In another form of anchoring device, a shallow grooved thread extends into the zone of the tip of the device to afford increased extraction values for relatively short anchoring devices. In use the anchoring device is driven through a damming disc placed on the receiving material and a further increase in the adhesion strength is developed. The relatively deep thread groove formed in the anchoring device produces the disadvantage that the material flowing into the groove during the driving operation is sheared off as the device continues to penetrate and as a result increased adhesion strength is not obtained since the material disposed within the thread grooves is cut or sheared off from the remainder of the receiving material. Moreover, when such anchoring devices are driven into a receiving material there is a considerable danger of breakage due to the notch effect at the threaded portion of the anchoring devices.

In other types of anchoring devices, a deeply grooved thread has been provided in the leading end or tip as well as in the shank portion of the device which is inserted into the receiving material, in order that the device which is set into rotation when it is driven by a powder charge will screw itself into the receiving material. In addition to the increased possibility of breakage at the thread in such a device there is also the likelihood of torsion damage to such a device. Moreover, it is possible that such devices will be easily loosened from receiving material if they are subjected to vibrations.

The primary object of the present invention is to afford an anchoring device which, despite a relatively short shank length inserted into a receiving material, has a considerably increased extraction value and avoids the disadvantages of the prior art devices mentioned above.

Another object of the invention is to afford a roughened or knurled surface on a frusto-conically shaped shank portion of an anchoring device for increasing the adhesion between the receiving material and the device.

A further object of the invention is to provide a knurled surface on the anchoring device wherein the depth or height of the knurled protuberances are of varying dimensions over the axial length of the knurled surface.

Yet another object of the invention is to provide the frusto-conically shaped knurled portion of the anchoring device with a pitch angle whereby a favorable friction angle is achieved between the anchoring device and the receiving material.

Therefore, in the present invention the anchoring device is provided with a shank portion which is driven into the receiving material. The shank portion has a leading end which enters the receiving material first and a frusto-conically shaped section of the shank extends rearwardly from the leading end toward its trailing end. For achieving greater adhesion between the anchoring device and the receiving material the frusto-conically shaped portion is knurled for at least a portion of its surface whereby the receiving material flows into the grooves formed between the knurled ridges or protuberances and affords an increased bond with the anchoring device.

Since the anchoring device is knurled on a frusto-conically shaped section of its shank extending between an ogival tip and its trailing edge or between the ogival tip and a cylindrical shank section, the adhesion strength between the device and the receiving material is greatly increased and the extraction values up to about 1200 kp. can be attained.

In knurling the tapering shank surfaces of the anchoring device, knurling rollers are set obliquely to the surface of the shank so that varying depths of knurling are achieved over the surface of the shank.

The high extraction values attained by the present invention are attributable to the fact that in the frusto-conical region of the anchoring device the elasticity of the receiving material is maintained. Accordingly, when the material flows into the depressions provided in the knurled surface there is no shearing off of the material and a greater adhering force is obtained than has been possible in the past. Accordingly, the anchoring device is secured in the receiving material not only by friction but also by positive interengagement between the anchoring device and the receiving material.

Advantageously the pitch angle of the frusto-conically or tapered portion of the shank is in the range of 2 to 7½ degrees and, preferably, the pitch angle is at 5 degrees whereby a favorable friction angle is obtained between the anchoring device and the receiving material.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and descriptive matter in which there are illustrated and described preferred embodiments of the invention.

DETAILED DESCRIPTION OF THE PREFERRED EMBODIMENTS

Figure 1:
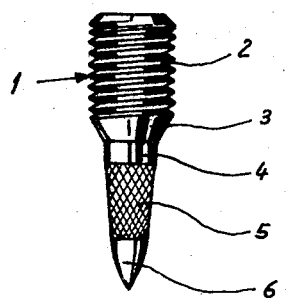
FIG. 1 is a side elevational view of an anchoring device embodying the present invention.

In FIG. 1 a longitudinally extending anchoring device or stud 1 is shown having a threaded portion 2 at its end arranged to extend outwardly from a receiving surface. The portion of the stud 1 arranged to be inserted into the receiving surface is comprised of a frusto-conically transition section 3 extending axially from the threaded portion 2 to a short cylindrical shank section 4. Adjoining the cylindrical shank portion 4 is a frusto-conically shaped shank section 5 and an ogival tip 6. The frusto-conically shaped shank section 5 is provided with knurling in a diamond pattern which extends from the tip 6 to the cylindrical shank section 4. The knurling on the frusto-conically shaped section shank 5 combines with its self-restraining action to provide an anchoring effect within the receiving material. Because of its frusto-conical shape the shank portion 5 does not shear off the receiving material as it is inserted, but the receiving material flows into the depressions formed between the knurling ridges to achieve an anchoring effect between the stud 1 and the receiving material.

Figure 2:
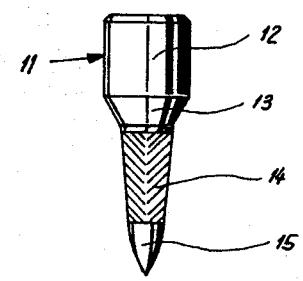
FIG. 2 is a side elevational view of another anchoring device similar to the one shown in FIG. 1.

In FIG. 2 an anchoring device or stud 11, generally similar to that shown in FIG. 1, is illustrated, however, it has an unthreaded head portion 12. Extending axially from the head portion 12 is a conical transition section 13 which terminates in a frusto-conically shaped shank section 14. The leading end of the anchoring device is formed by a tip 15 in ogival form which extends axially from the frusto-conically shaped shank section 14. The frusto-conically shaped shank section 14 is provided with knurling in a herringbone pattern to achieve an increase in the anchoring forces between the stud 1 and the receiving material into which it is driven.

Figure 3:
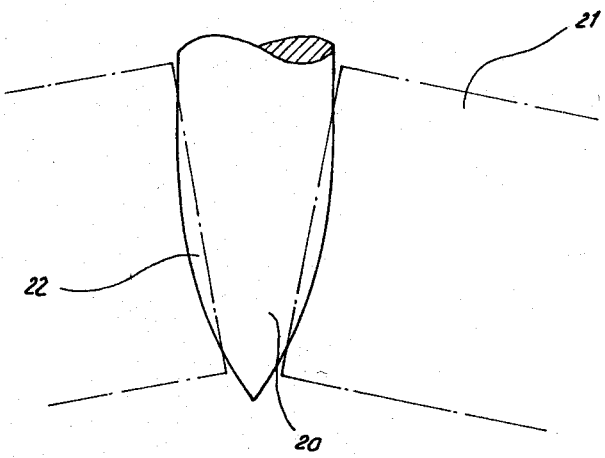
FIG. 3 is a diagrammatic representation of means for varying the depth of the knurling in the shank surface of an anchoring device.

As mentioned above one of the features of the present invention is the varying depth of the knurling ridges and depressions formed on a section of the stud which is inserted into the receiving material. To accomplish the variation in the height of the knurling an arrangement such as shown in FIG. 3 is employed where threaded rollers 20 are disposed obliquely with respect to the tapered or frusto-conically shaped surface of the stud and there results a difference in the depth of the knurling along the stud. As indicated by FIG. 3 the depth or height of the knurling formed on the stud increases from the ends to the center of the knurled section.

While specific embodiments of the invention have been shown and described in detail to illustrate the application of the inventive principles, it will be understood that the invention may be embodied otherwise without departing from such principles.

What is claimed is:

1. An anchoring device arranged to be driven by means of an explosive charge into a metallic receiving material such as steel, constructional iron, sheet metal, and similar metallic materials, comprising an axially extending shank portion having a pointed leading end spaced axially from a trailing end and arranged to have its leading end driven first into the receiving material, the said leading end diverging outwardly to a location spaced axially from its pointed end, an axially extending frusto-conically spaced section of said shank portion tapering outwardly from the rearward end of said leading end toward the trailing end of said shank portion, at least an axially extending portion of said tapered section being knurled for providing alternating ridges and depressions extending obliquely to the axis of said shank portion, and said knurled tapered section of said shank portion arranged to be in direct contact with the receiving material into which the anchoring device is driven so that said knurled tapered section provides increased anchoring engagement with the metallic receiving material.

2. An anchoring device as set forth in claim 1, wherein said tapered section is knurled in a diamond shaped pattern.

3. An anchoring device as set forth in claim 1, wherein said tapered section is knurled in a herringbone pattern.

4. An anchoring device as set forth in claim 1, wherein the leading end of said shank portion is formed by an ogival tip extending axially from said frusto-conically shaped knurled tapered section.

5. An anchoring device as set forth in claim 4, wherein the trailing end of said shank is formed by a frusto-conically shaped transition section extending from said knurled frusto-conically shaped tapered section and the pitch angle of said transition section is greater than the pitch angle of the knurled frusto-conically shaped tapered section.

6. An anchoring device as set forth in claim 1, wherein the frusto-conically shaped knurled section of said shank portion has a pitch angle in the range of 2 to 7.5 degrees.

7. An anchoring device, as set forth in claim 1, wherein the depth of the knurled surfaces in said tapered section vary in the axial length of said shank portion with the depth of said knurled surfaces being at a minimum at the forward end of said knurled surface and increasing in depth in the direction of the trailing end.

8. An anchoring device, as set forth in claim 1, wherein said frusto-conically shaped tapered section of said shank portion is knurled for the entire extent of its axial length, and the trailing end of said shank portion comprises an axially extending cylindrically shaped section extending rearwardly from the end of said knurled tapered section at a location spaced axially from the rearward end of said knurled tapered section.

9. An anchoring device arranged to be driven by means of an explosive charge into a metallic receiving material such as steel, constructional iron, sheet metal, and similar metallic materials comprising axially extending shank portion having a pointed leading end and a trailing end and arranged to have its leading end driven first into the receiving material an axially extending section of said shank tapering outwardly from a location near the leading end toward the trailing end thereof, at least an axially extending portion of said tapered section being knurled for providing alternating ridges and depression extending obliquely to the axis of said shank portion for providing increased anchoring engagement with the metallic receiving material, and the depth of the depressions formed in the knurled surface of said tapered section being of increasing depth in the axial direction of said shank from the opposite ends of the knurled surface to a location intermediate the end of the knurled surface.

References Cited

UNITED STATES PATENTS

| | | | |
|---|---|---|---|
| 1,144,700 | 6/1915 | Edwards | 85—28 |
| 2,855,817 | 10/1958 | Kope. | |
| 3,377,903 | 4/1968 | Korte. | |

FOREIGN PATENTS

| | | |
|---|---|---|
| 1,099,960 | 2/1961 | Germany. |
| 1,181,138 | 11/1964 | Germany. |
| 615,250 | 7/1935 | Germany. |
| 629,455 | 12/1961 | Italy. |
| 152,760 | 12/1950 | Sweden. |

RAMON S. BRITTS, Primary Examiner